United States Patent
Curtis

(10) Patent No.: US 8,160,728 B2
(45) Date of Patent: Apr. 17, 2012

(54) METHODS OF DETERMINING COMPLETE SENSOR REQUIREMENTS FOR AUTONOMOUS MOBILITY

(75) Inventor: Steven A. Curtis, Dayton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 384 days.

(21) Appl. No.: 12/558,672

(22) Filed: Sep. 14, 2009

(65) Prior Publication Data

US 2011/0066284 A1 Mar. 17, 2011

(51) Int. Cl.
*G06F 19/00* (2006.01)
*G05B 15/00* (2006.01)

(52) U.S. Cl. ............ 700/30; 700/245; 700/253; 700/48; 700/258; 701/1

(58) Field of Classification Search ........ 701/1; 700/28, 700/30, 31, 47, 245, 253, 48, 246, 258
See application file for complete search history.

(56) References Cited

U.S. PATENT DOCUMENTS

| | | | | |
|---|---|---|---|---|
| 5,414,619 A | * | 5/1995 | Katayama et al. | 700/31 |
| 5,477,825 A | * | 12/1995 | Hattori et al. | 123/399 |
| 5,498,943 A | * | 3/1996 | Kimoto et al. | 318/601 |
| 5,963,710 A | * | 10/1999 | Masumoto | 700/259 |
| 6,175,772 B1 | * | 1/2001 | Kamiya et al. | 700/31 |
| 6,459,955 B1 | * | 10/2002 | Bartsch et al. | 700/245 |
| RE39,534 E | * | 3/2007 | Cooperberg et al. | 700/28 |
| 2007/0219666 A1 | * | 9/2007 | Filippov et al. | 700/245 |
| 2008/0294288 A1 | * | 11/2008 | Yamauchi | 700/258 |

* cited by examiner

*Primary Examiner* — Ronnie Mancho

(57) ABSTRACT

A method of determining complete sensor requirements for autonomous mobility of an autonomous system includes computing a time variation of each behavior of a set of behaviors of the autonomous system, determining mobility sensitivity to each behavior of the autonomous system, and computing a change in mobility based upon the mobility sensitivity to each behavior and the time variation of each behavior. The method further includes determining the complete sensor requirements of the autonomous system through analysis of the relative magnitude of the change in mobility, the mobility sensitivity to each behavior, and the time variation of each behavior, wherein the relative magnitude of the change in mobility, the mobility sensitivity to each behavior, and the time variation of each behavior are characteristic of the stability of the autonomous system.

20 Claims, 7 Drawing Sheets

EQUATION 1:

$$\frac{db_k}{dt} = \sum_i \sum_j \underbrace{\frac{\partial b_k}{\partial P_{ij}}}_{301} \underbrace{\left(\frac{\partial P_{ij}}{\partial t}\right.}_{302} + \underbrace{\left.\frac{\partial x}{\partial t}\frac{\partial P_{ij}}{\partial x}\right)}_{303}$$

FIG. 3

EQUATION 2:

$$\frac{dM}{dt} = \sum_k \underbrace{\frac{dM}{db_k} \frac{db_k}{dt}}_{401}$$

EQUATION 3:

$$\sum_k \underbrace{\frac{dM}{db_k} \frac{db_k}{dt}}_{401} = \sum_k \underbrace{\frac{dM}{db_k}}_{401} \sum_i \sum_j \frac{\partial b_k}{\partial P_{ij}} \left( \frac{\partial P_{ij}}{\partial t} + \frac{\partial x}{\partial t} \frac{\partial P_{ij}}{\partial x} \right)$$

FIG. 4

METHODS OF DETERMINING COMPLETE SENSOR REQUIREMENTS FOR AUTONOMOUS MOBILITY

GOVERNMENT INTEREST

The embodiments of the invention described herein were made by employees of the United States Government, and may be manufactured and used by or for the United States Government for governmental purposes without payment of any royalties thereon or therefor.

BACKGROUND

This application relates generally to the field of autonomous mobility, and specifically to methods of determining complete sensor requirements for autonomous mobility of autonomous systems.

Synthetic systems require a balance between sensory input and mobility. Generally, current approaches to sensor balance include a trial-and-error approach. It is readily apparent that as Synthetic Skeletal Muscular Systems (SSMS) increase in complexity, the computational bandwidth of trial-and-error approaches increases dramatically and hence mathematical solutions for the trial-and-error approaches suffer from geometrically increasing complexity.

Thus, there is a need to overcome these shortcomings.

BRIEF SUMMARY

An example embodiment of the present invention includes a method of determining complete sensor requirements for autonomous mobility of an autonomous system. The method includes computing a time variation of each behavior of a set of behaviors of the autonomous system, determining mobility sensitivity to each behavior of the autonomous system, and computing a change in mobility based upon the mobility sensitivity to each behavior and the time variation of each behavior. The method further includes determining the complete sensor requirements of the autonomous system through analysis of the relative magnitude of the change in mobility, the mobility sensitivity to each behavior, and the time variation of each behavior, wherein the relative magnitude of the change in mobility, the mobility sensitivity to each behavior, and the time variation of each behavior are characteristic of the stability of the autonomous system.

An example embodiment of the present invention includes a computer readable storage medium including computer-executable instructions that, when executed on a computer processor, direct the computer processor to perform a method of determining complete sensor requirements for autonomous mobility of an autonomous system. The method includes computing a time variation of each behavior of a set of behaviors of the autonomous system, determining mobility sensitivity to each behavior of the autonomous system, and computing a change in mobility based upon the mobility sensitivity to each behavior and the time variation of each behavior. The method further includes determining the complete sensor requirements of the autonomous system through analysis of the relative magnitude of the change in mobility, the mobility sensitivity to each behavior, and the time variation of each behavior, wherein the relative magnitude of the change in mobility, the mobility sensitivity to each behavior, and the time variation of each behavior are characteristic of the stability of the autonomous system.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 3 illustrates the time variation of a set of behaviors of an autonomous system, according to an example embodiment;

FIG. 4 illustrates the time variation of mobility of an autonomous system, according to an example embodiment;

DETAILED DESCRIPTION

Figure 1:
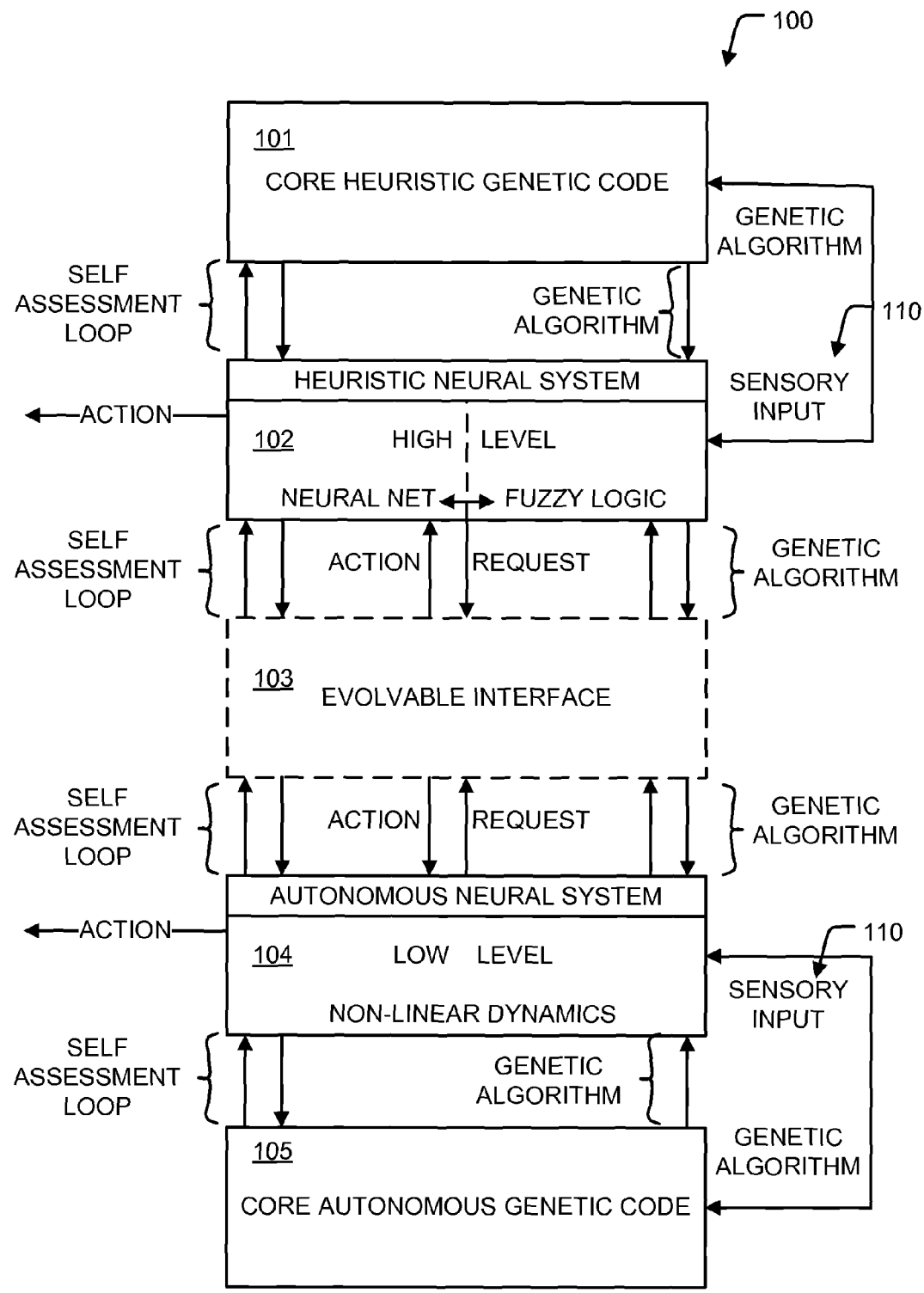
FIG. 1 illustrates an example neural map, according to an example embodiment.

Detailed illustrative embodiments are disclosed herein. However, specific structural and functional details disclosed herein are merely representative for purposes of describing example embodiments.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. Furthermore, some steps, acts, and/or functions of any methodology may be implemented in alternating order depending upon the function/acts involved.

Hereinafter, example embodiments will be described with reference to the attached drawings. Example embodiments of the present invention may include methods of determining complete sensor requirements for autonomous mobility. These methods provide a Sensor Completeness Requirements Algorithm for Autonomous Mobility (SCRAAM) which provide the basis for selecting which environmental changes produce the greatest mobility-related changes, and hence, provide the basis for determining sensor capabilities which are greatly critical for autonomous mobility.

Synthetic systems may be comprised of a neural system, a skeletal muscular system, and sensory input system. The sensory input system may include a variety of sensors of different types/forms tied into or fed into the neural system as sensory input. The sensors may be centrally located on the skeletal muscular system as "remote" sensors, or may be located at different point/portions of the skeletal muscular system providing more defined sensing.

The neural system, or synthetic neural system (SNS), may be a tiered neural system, for example, as mapped in FIG. 1.

FIG. 1 illustrates an example neural map, according to an example embodiment. The neural map is an example neural map for a neural basis function (NBF) 100 of a synthetic neural system.

Similar synthetic neural systems are described in detail in U.S. Pat. No. 7,512,568 entitled "EVOLVABLE SYNTHETIC NEURAL SYSTEM" filed on Apr. 8, 2005, the entire contents of which are hereby incorporated by reference. Furthermore, methods for determining the stability of such synthetic neural systems are described in detail in U.S. patent application Ser. No. 11/861,687 entitled "SYSTEM AND METHOD FOR DETERMINING STABILITY OF A NEURAL SYSTEM" filed on Sep. 26, 2007, the entire contents of which are hereby incorporated by reference.

The NBF 100 is a bi-level mapping including a heuristic portion and an autonomous portion. The heuristic portion includes core heuristic genetic code (CHGC) 101 and heuristic neural system (HNS) 102. The autonomous portion includes autonomous neural system (ANS) 104 and core autonomous genetic code (CAGC) 105.

According to at least one example embodiment, NBF 100 includes a self-assessment loop (SAL) at each interface between components of the bi-level system. Each SAL continuously gauges efficiency of operations of the combined HNS 102 and ANS 104. The standards and criteria of the efficiency are set or defined by objectives of the NBF 100.

According to at least one example embodiment, NBF 100 also includes genetic algorithms (GA) at each interface between components. The GAs modify an evolvable interface 103 to satisfy requirements of the SALs during learning, task execution or impairment of other subsystems.

Similarly, the HNS 102 includes a SAL interface and a GA interface to the core heuristic genetic code (CHGC) 101, and the ANS 104 includes a SAL interface and a GA interface to the core autonomic genetic code (CAGC) 105. The CHGC 101 and CAGC 105 allow modifications to functionality in response to new objectives or injury. The CHGC 101 and the CAGC 105 elements are not part of an operational neural system, but rather store architectural constraints on the operating neural system for both portions of the bi-level system. The CHGC 101 and the CAGC 105 are both modifiable depending on variations in sensory inputs via the GAs. Sensory inputs may be sensory inputs from a suite of sensors, which are described more fully below.

According to at least one example embodiment, the CHGC 101 and the CAGC 105 in conjunction with SALs and GAs are generalized within this self-similar neural system (e.g. entire synthetic neural system) to reconfigure the relationship between a plurality of NBFs as well as to permit the instantiation of new NBFs to increase the overall fitness of the entire synthetic neural system. Thus, NBF 100 provides a form of evolution possible only over generations synthetic neural systems.

According to at least one example embodiment, HNS 102 and ANS 104 receive sensory input from a sensory suite, process the sensory input and generate high level actions. Hereinafter, a complete autonomous system is described with reference to FIG. 2.

Figure 2:
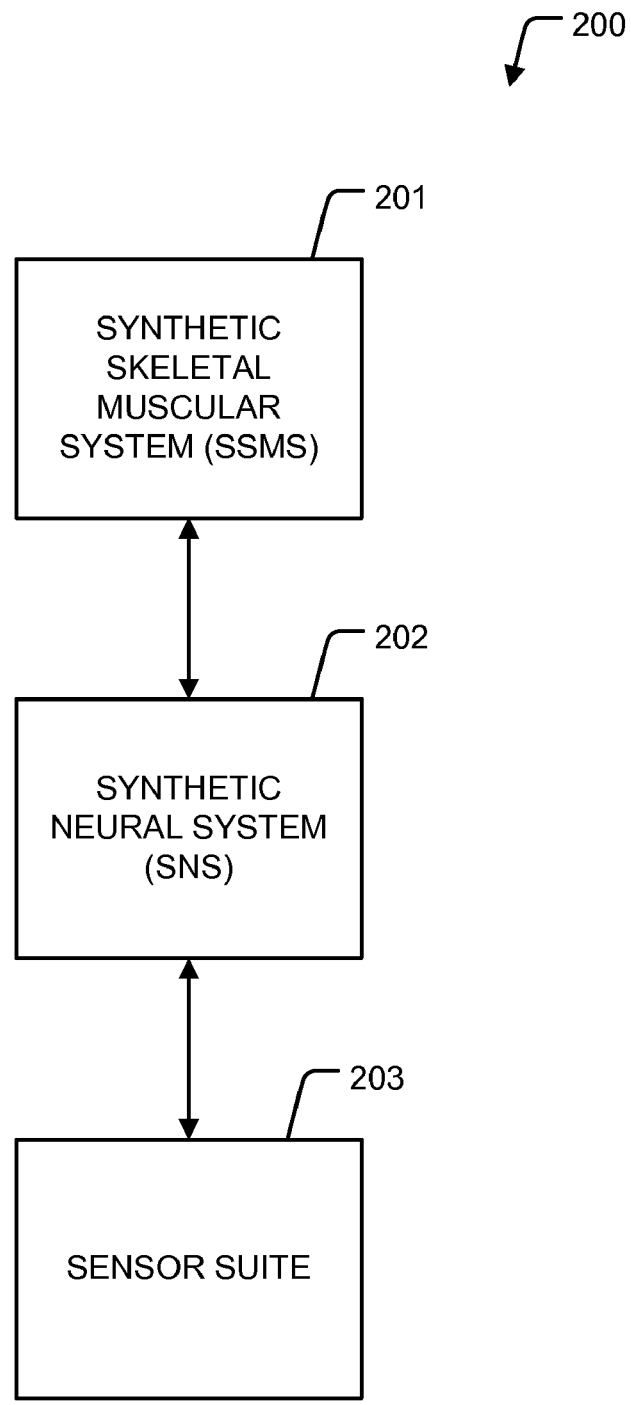
FIG. 2 illustrates an autonomous system with autonomous mobility, according to an example embodiment.

FIG. 2 illustrates an autonomous system with autonomous mobility, according to an example embodiment. The system 200 includes a synthetic skeletal muscular system (SSMS) 201. Similar systems are described in detail in U.S. Pat. No. 7,512,568 entitled "EVOLVABLE SYNTHETIC NEURAL SYSTEM" filed on Apr. 8, 2005, the entire contents of which have been incorporated by reference above.

The SSMS 201 may be embodied as a three-dimensional (3D) hierarchical evolvable synthetic system. The SSMS 201 may include a plurality of subsystems (e.g., ruler subsystem, worker subsystems, etc).

The system 200 further includes synthetic neural system (SNS) 202 in communication with SSMS 201. The SNS 202 may include NBFs tied to form an entire synthetic neural system through GA interfaces as described with reference to FIG. 1. Further, SNS 202 may be in communication with SSMS 201 through action interfaces of the bi-level NBF 100 as described with reference to FIG. 1. Therefore, exhaustive description of these similar features will be omitted herein for the sake of brevity.

The system 200 further includes sensor suite 203 in communication with the SNS 202. The sensor suite 200 may include a plurality of sensors suited to balance the mobility of system 200 and to tie the SNS 202 to the environment. For example, typical sensors may include electromagnetic sensors, acoustic sensors, gravity sensors, chemical sensors, or any other suitable form of sensor. Additionally, each sensor may have an associated power spectrum. For example, an electromagnetic sensor may include a power spectrum from Direct Current (infinite wavelength) to gamma rays, an acoustic sensor may have a power spectrum from touch to remote (sonar), et cetera.

Depending upon any particular environment for which the system 200 may interact, different sensor capabilities may be necessary for true autonomous mobility. Furthermore, the three-dimensional nature of SSMS 201 provides a three-dimensional complexity to the placement of each sensor. Additionally, the SNS 202 necessitates sensory input for environmental ties, and action output to the SSMS 201 for actual changes in motion, position, etc. Therefore, methods of determining complete sensor requirements of the system 200 are provided below to reduce the complexity of determining said complete sensor requirements.

FIG. 3 illustrates the time variation of a set of behaviors of an autonomous system, according to an example embodiment. In equation 1 of FIG. 3, the time variation of a set of behaviors $\{b_k\}$ is determined through summation of behavioral sensitivity, absolute time variability, and changes caused by movement of a plurality of sensors of a SSMS over a set of power spectra of stimuli i in a characteristic parameter range j. Term 301 of Equation 1 denotes behavioral sensitivity to spectral changes of the plurality of sensors. Term 302 of Equation 1 denotes absolute time variability. Term 303 of Equation 3 denotes changes caused through movement of the plurality of sensors in x. Thus, through determination of terms 301-303, the time variability for the entire set of behaviors $\{b_k\}$ may be computed accurately.

FIG. 4 illustrates the time variation of mobility of an autonomous system, according to an example embodiment. In Equation 2 of FIG. 4, the time variation of mobility is determined through the summation over the size k of the set of behaviors $\{b_k\}$. Term 401 of Equation 2 denotes the mobility sensitivity of the autonomous system to a behavior of the set of behaviors $\{b_k\}$. Thus, the time variability of mobility may be computed accurately. Equation 3 of FIG. 4 outlines a more detailed representation of Equation 2, which is a summation of mobility sensitivity over the time variability of behaviors of the synthetic system.

Thus, Equations 1-3 produce the entire set of mobility sensitivities to be monitored in developing the autonomous mobility of an autonomous system in a given behavioral context, taking into consideration a complete set of available sensors/power spectra. Further, Equations 1-3 provide the basis for selecting which environmental changes produce the greatest mobility-related behavioral changes and hence which sensor capabilities are most critical for autonomous mobility. Equations 1-3 may optimize sensor selection subject to resource limitations for near optimal performance by sorting through a large set of candidate environments, and thus determining sensor needs through an examination of the relative magnitude of the terms in Equation 3. The sensor needs are based upon increasing the stability of the autonomous system through balance of the magnitudes.

Figure 5:
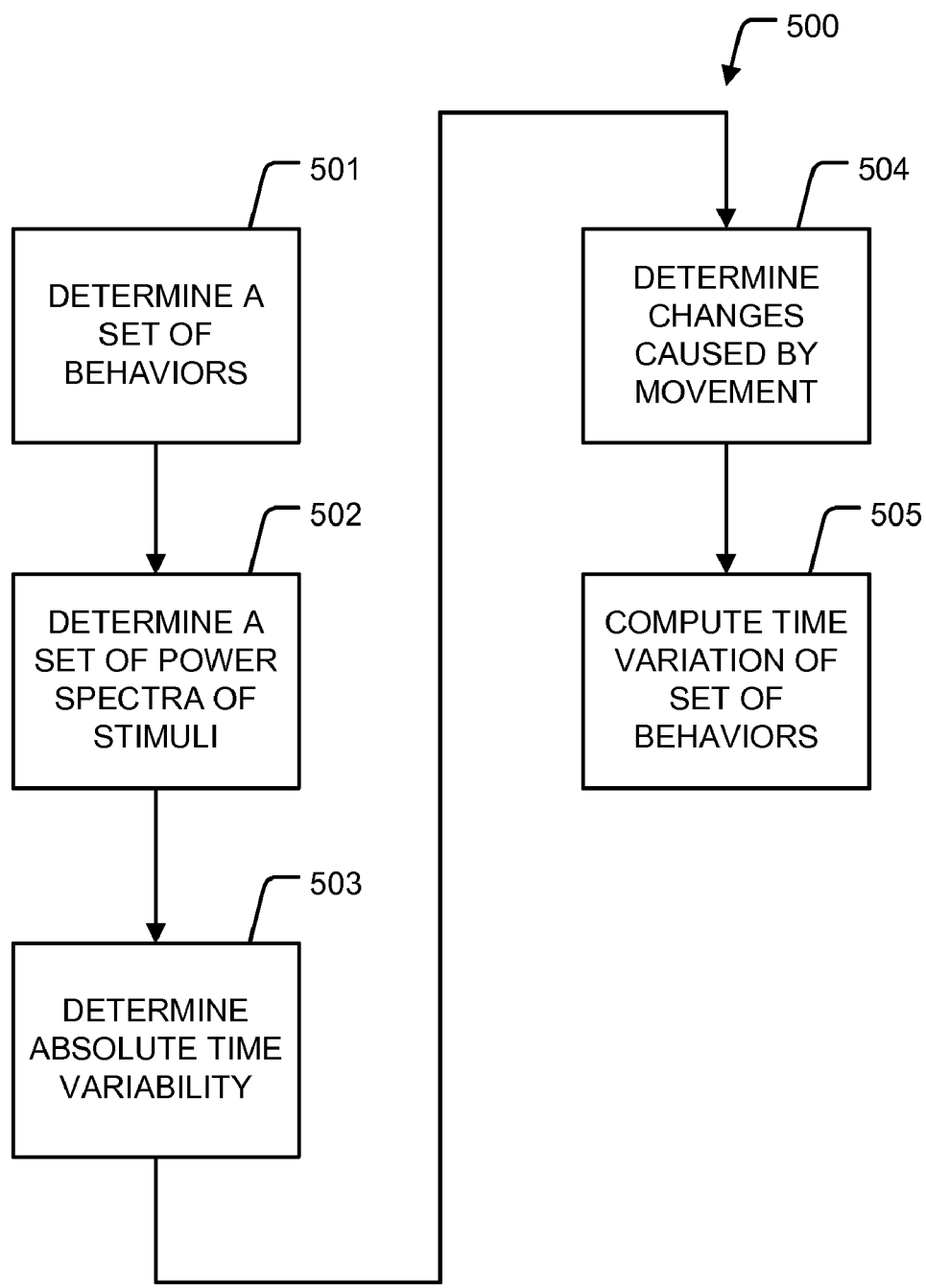
FIG. 5 is a flowchart of a method of determining complete sensor requirements for autonomous mobility, according to an example embodiment.

FIG. 5 is a flowchart of a method of determining complete sensor requirements for autonomous mobility, according to an example embodiment. Generally, the method 500 follows Equation 1 of FIG. 3. For example, method 500 includes determining a set of behaviors $\{b_k\}$ for an autonomous system. The method 500 further includes determining a set of power spectra of stimuli at block 502. Method 500 further includes determining absolute time variability at block 503. Method 500 further includes determining changes caused by movement of the autonomous system. Finally, method 500 includes computing the time variation of the set of behaviors through summation of the behaviors, absolute time variability, and changes caused by movement over a characteristic parameter range for a plurality of sensors being considered. Using the time variation of behaviors, the change in mobility over time of the autonomous system may be computed using Equations 2-3 described above. Method 600 describes the methodology in more detail.

Figure 6:
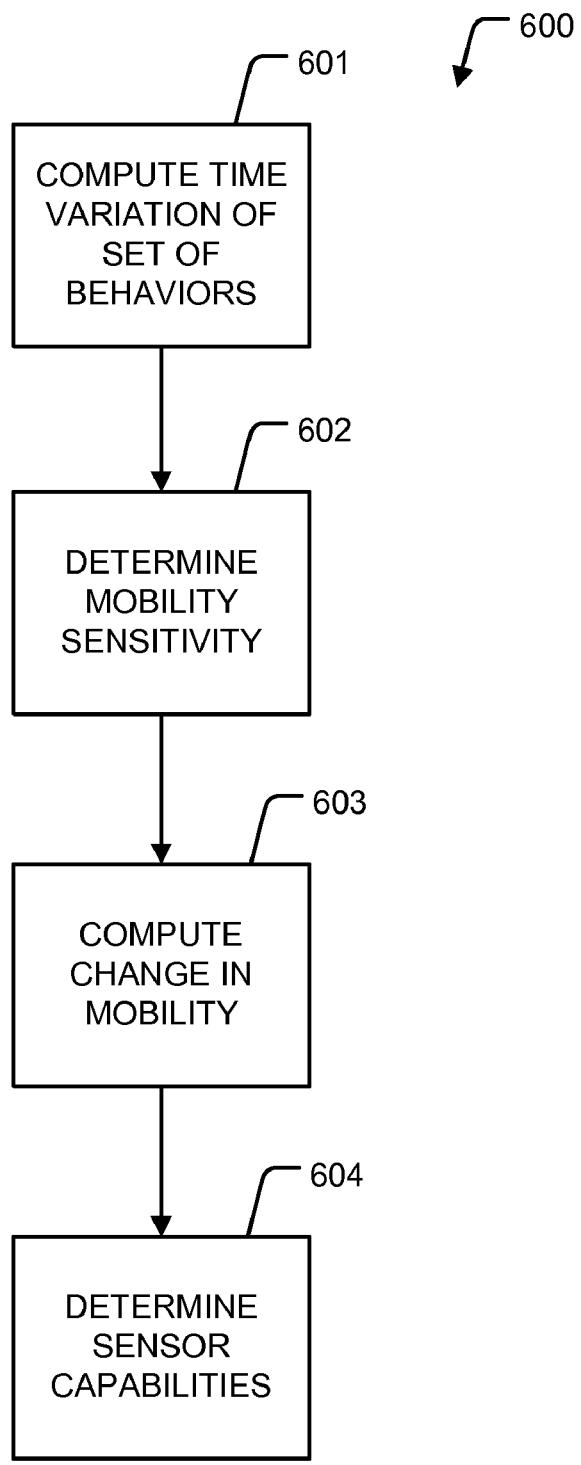
FIG. 6 is a flowchart of a method of determining complete sensor requirements for autonomous mobility, according to an example embodiment.

FIG. 6 is a flowchart of a method of determining complete sensor requirements for autonomous mobility, according to an example embodiment. Method 600 includes computing the time variation of a set of behaviors at block 601. Method 600 further includes determining mobility sensitivity to each behavior of the set of behaviors determined at block 501, in block 602. Thereafter, the change in mobility may be computed at block 603.

Finally, complete sensor capabilities and requirements for a given environment may be determined through examination of the relative magnitudes of the mobility sensitivity, time variation of behaviors, and change in mobility at block 604, including considering the balance of each of these magnitudes.

Described above are methods of determining complete sensor requirements for autonomous mobility of an autonomous system. The methods consider the relative magnitude of the changes in mobility of the autonomous system, the changes in behavior of the autonomous system, and the mobility sensitivity, which are further determined through analysis of behavioral sensitivity, absolute time variability, and changes caused by movement of the autonomous system. Through completeness of sensor requirements of sensors attached to an autonomous system, a more stable, and therefore trainable, system is achievable.

Figure 7:
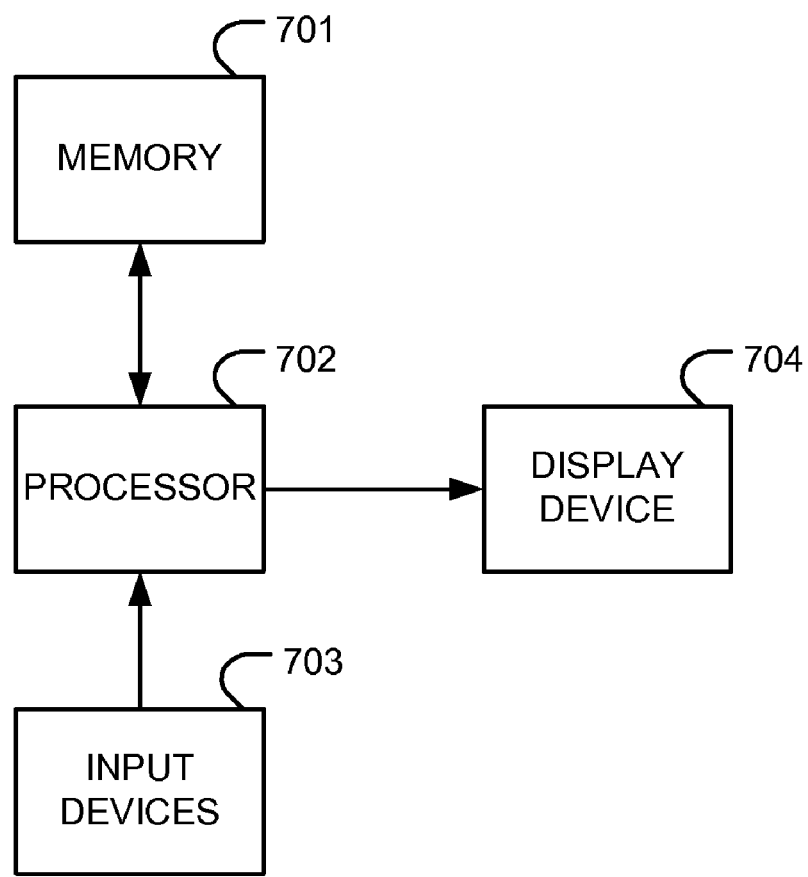
FIG. 7 illustrates a computer apparatus, according to an example embodiment.

Additionally, the methodologies and systems of example embodiments of the present invention may be implemented in hardware, software, firmware, or a combination thereof. For example, according to an exemplary embodiment, the methodologies described hereinbefore may be implemented by a computer system or apparatus. For example, FIG. 7 illustrates a computer apparatus, according to an exemplary embodiment. Therefore, portions or the entirety of the methodologies described herein may be executed as instructions in a processor 702 of the computer system 700. The computer system 700 includes memory 701 for storage of instructions and information, input device(s) 703 for computer communication, and display device 704. Thus, the present invention may be implemented, in software, for example, as any suitable computer program on a computer system somewhat similar to computer system 700. For example, a program in accordance with the present invention may be a computer program product causing a computer to execute the example methods described herein.

The computer program product may include a computer-readable storage medium having computer program logic or code portions embodied thereon for enabling a processor (e.g., 702) of a computer apparatus (e.g., 700) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks, cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

Detailed illustrative embodiments are described above. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the inven-

The invention claimed is:

1. A computer readable storage medium having computer executable instructions stored thereon, which, when executed by a computer processor, direct the computer processor to perform a method of determining complete sensor requirements for autonomous mobility of an autonomous system, the method comprising:
computing a time variation of each behavior of a set of behaviors of the autonomous system;
determining mobility sensitivity to each behavior of the autonomous system;
computing a change in mobility based upon the mobility sensitivity to each behavior and the time variation of each behavior; and
determining the complete sensor requirements of the autonomous system through analysis of the relative magnitude of the change in mobility, the mobility sensitivity to each behavior, and the time variation of each behavior, wherein the relative magnitude of the change in mobility, the mobility sensitivity to each behavior, and the time variation of each behavior are characteristic of the stability of the autonomous system.

2. The storage medium of claim 1, wherein determining the complete sensor requirements includes determining sensor requirements based on increasing the stability of the autonomous system.

3. The storage medium of claim 1, wherein the method further comprises:
determining a set of behaviors of the autonomous system; and
determining behavioral sensitivity of each behavior of the set of behaviors to spectral changes of a plurality of sensors.

4. The storage medium of claim 3, wherein the method further comprises:
determining an absolute time variability of the spectral changes of the plurality of sensors;
determining spectral changes of the plurality of sensors caused by movement of the autonomous system;
determining the behavioral sensitivity of each behavior of the set of behaviors to the spectral changes of the plurality of sensors.

5. The storage medium of claim 1, wherein the method further comprises:
determining a set of power spectra of stimuli of a plurality of sensors; and
determining a characteristic parameter range for the plurality of sensors;
wherein the time variation of each behavior of a set of behaviors of the autonomous system is based on summation of behavioral sensitivities to spectral changes of the plurality of sensors over the set of power spectra and the characteristic parameter range.

6. The storage medium of claim 1, wherein the autonomous system is configured to include a neural base function bi-level neural system, the neural system including at least one heuristic portion and at least one autonomous portion, and the at least one heuristic portion and the at least one autonomous portion receiving sensory input from a plurality of sensors for which the sensor requirements are computed.

7. The storage system of claim 1, wherein the autonomous system is configured to include a synthetic skeletal muscular system (SSMS), the SSMS including a plurality of sensor for which the sensor requirements are computed.

8. The storage medium of claim 1, wherein the complete sensor requirements are a collective set of sensor requirements for a plurality of sensors providing the most stability to the autonomous system.

9. The storage medium of claim 1, wherein the complete sensor requirements are a collective set of sensor requirements for a plurality of sensors configured to provide sensory input to the autonomous system.

10. The storage medium of claim 1, wherein the complete set of sensor requirements are a collective set of sensor requirements for a plurality of sensors, the plurality of sensors including at least one of an electromagnetic sensor, an acoustic sensor, an accelerometer, and a chemical-sensor.

11. A method of determining complete sensor requirements for autonomous mobility of an autonomous system, the method comprising:
computing a time variation of each behavior of a set of behaviors of the autonomous system;
determining mobility sensitivity to each behavior of the autonomous system;
computing a change in mobility based upon the mobility sensitivity to each behavior and the time variation of each behavior; and
determining the complete sensor requirements of the autonomous system through analysis of the relative magnitude of the change in mobility, the mobility sensitivity to each behavior, and the time variation of each behavior, wherein the relative magnitude of the change in mobility, the mobility sensitivity to each behavior, and the time variation of each behavior are characteristic of the stability of the autonomous system.

12. The method of claim 11, wherein determining the complete sensor requirements includes determining sensor requirements based on increasing the stability of the autonomous system.

13. The method of claim 11, further comprising:
determining a set of behaviors of the autonomous system; and
determining behavioral sensitivity of each behavior of the set of behaviors to spectral changes of a plurality of sensors.

14. The method of claim 13, further comprising:
determining an absolute time variability of the spectral changes of the plurality of sensors;
determining spectral changes of the plurality of sensors caused by movement of the autonomous system;
determining the behavioral sensitivity of each behavior of the set of behaviors to the spectral changes of the plurality of sensors.

15. The method of claim 11, further comprising:
determining a set of power spectra of stimuli of a plurality of sensors; and
determining a characteristic parameter range for the plurality of sensors;
wherein the time variation of each behavior of a set of behaviors of the autonomous system is based on summation of behavioral sensitivities to spectral changes of the plurality of sensors over the set of power spectra and the characteristic parameter range.

16. The method of claim 11, wherein the autonomous system is configured to include a neural base function bi-level neural system, the neural system including at least one heuristic portion and at least one autonomous portion, and the at least one heuristic portion and the at least one autonomous portion receiving sensory input from a plurality of sensors for which the sensor requirements are computed.

17. The method of claim 11, wherein the autonomous system is configured to include a synthetic skeletal muscular system (SSMS), the SSMS including a plurality of sensor for which the sensor requirements are computed.

18. The method of claim 11, wherein the complete sensor requirements are a collective set of sensor requirements for a plurality of sensors providing the most stability to the autonomous system.

19. The method of claim 11, wherein the complete sensor requirements are a collective set of sensor requirements for a plurality of sensors configured to provide sensory input to the autonomous system.

20. The method of claim 11, wherein the complete set of sensor requirements are a collective set of sensor requirements for a plurality of sensors, the plurality of sensors including at least one of an electromagnetic sensor, an acoustic sensor, an accelerometer, and a chemical-sensor.

* * * * *